United States Patent Office 3,276,411
Patented Oct. 4, 1966

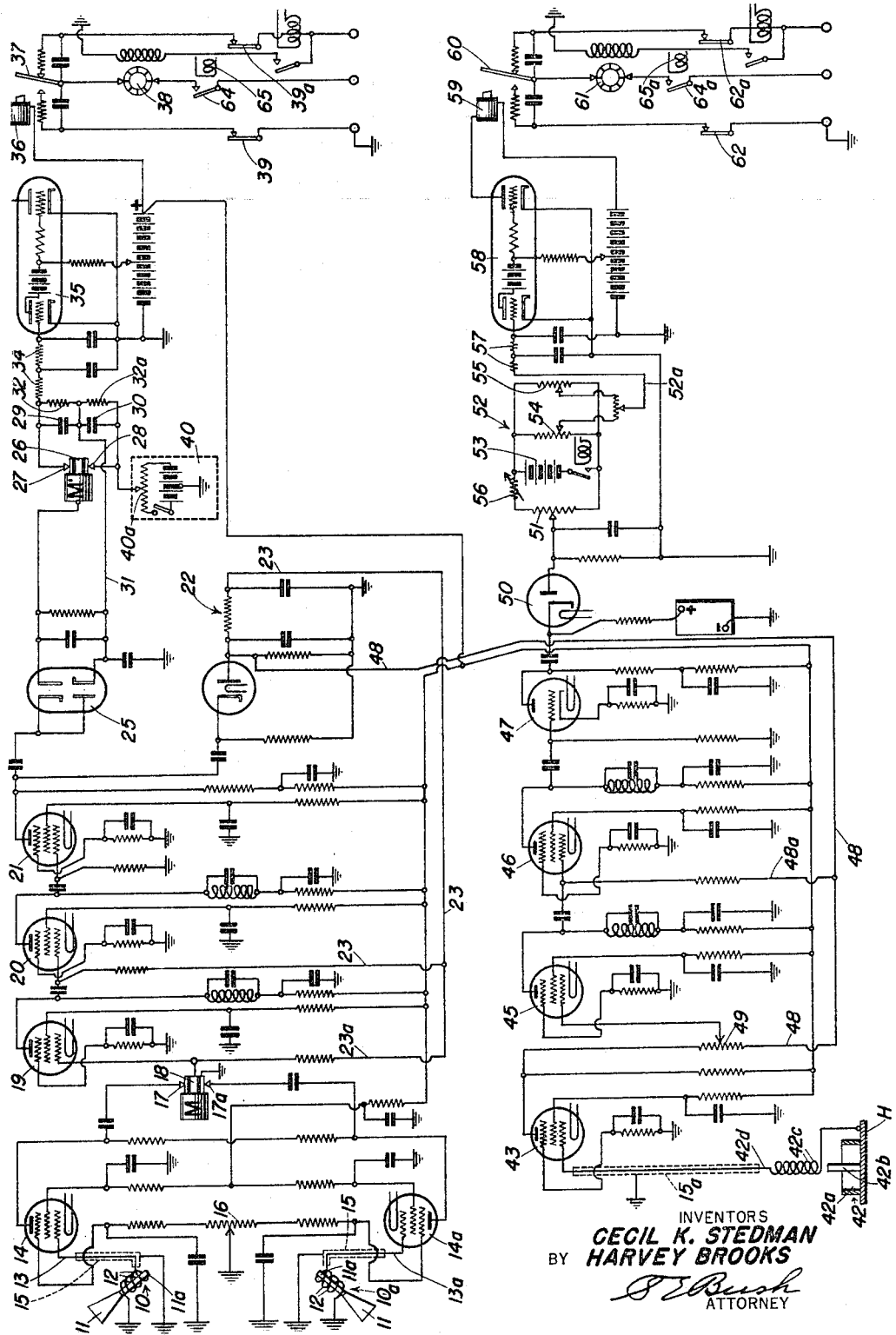

3,276,411
STEERING SYSTEM FOR TORPEDOES
Cecil K. Stedman, Watertown, and Harvey Brooks, Cambridge, Mass., assignors to the United States of America as represented by the Secretary of the Navy
Filed Sept. 11, 1943, Ser. No. 502,075
6 Claims. (Cl. 114—23)

This invention relates to control systems and more particularly to a novel electrical control system for use in automatically steering an underwater vehicle to a source of compressional waves transmitted through the water to the vehicle. The new system is accurate and reliable and may be used to advantage in antisubmarine warfare for steering a torpedo, or the like, to a submerged enemy submarine.

One object of the invention resides in the provision of an azimuth steering system for underwater vehicles, which comprises a pair of sensitive microphones or "ears" on opposite sides of the vehicle hull, and novel amplifying means for providing equal degrees of amplification of signals received by the two microphones, whereby the amplified signals may be used to control a rudder, or the like, for azimuth steering.

Another object of the invention is to provide an azimuth steering system of the character described including a single amplifier which is connected alternately to one microphone and then the other by a commutator or other cyclical switching means, the output end of the amplifier being connected through a synchronous cyclical switching means to a device for measuring the difference or percentage difference between the intensities of the amplified signals from the two microphones.

A further object of the invention is to provide in a steering system of the type described a device for measuring the percentage difference between the intensities of the amplified signals from the two microphones, which comprises a pair of condensers connected in opposed relation so that they are charged alternately through the synchronous switching means from the amplified output of first one microphone and then the other, whereby the output of the condensers may be used for controlling the azimuth steering device in accordance with the percentage difference in the intensities of the signals on the microphones.

Still another object of the invention is to provide in an underwater vehicle a novel steering system for oscillating the rudder back and forth at all times, except when a change in course is required, to prevent sticking of the rudder. Preferably, the oscillation of the rudder is effected by means of a potentiometer, or the like, movable with the rudder and acting to bias a control circuit for the rudder.

An additional object of the invention resides in the provision of a novel azimuth steering system comprising a plurality of stages of amplification for amplifying the output of a pair of microphones, and an automatic gain control connected to the output of the last stage of amplification with the output of the gain control impressed upon the control grid of at least one of the amplification stages, whereby the output voltage from the amplifiers is dependent upon the relative rather than the absolute amplitudes of the input signals from the microphones.

An additional object is to provide a steering system of the character described comprising a third microphone for controlling the depth steering of the vehicle and in which the amplifying means for the output of the depth microphone includes at least one stage of amplification wherein the control grid is biased by the output of the automatic gain control for the azimuth steering means.

Another object of the invention resides in the provision of a depth-steering system for underwater vehicles which comprises a control circuit biased by the amplified output of a depth-steering microphone and also biased in accordance with the action of a hydrostatic bellows, or other depth-measuring means, and the movements of a pendulum, whereby the output of the control circuit may be utilized for actuating the depth control rudder to maintain the vehicle on an even keel at a desired depth in the absence of a signal and to steer the vehicle in response to a signal on the depth microphone, without extreme movements of the rudder.

Another object of the invention is to provide an electrical system for automatically steering underwater vehicles, which comprises a pair of azimuth steering microphones and electrical biasing means causing the vehicle to cruise in a circle in the absence of a signal on the azimuth microphones.

These and other objects of the invention may be better understood by reference to the accompanying drawing illustrating one form of the new control system.

The control system, as shown, is adapted for use on an antisubmarine torpedo of the type which may be launched from an aircraft and which includes the usual hull, a suitable propulsion unit, azimuth and depth-steering rudders, and a high explosive charge in the head. By means of the rudders, the control system is operable to direct the torpedo to the submarine so as to destroy the same.

The control system comprises two magnetostrictive mirophones 10 and 10a mounted in the head of the torpedo in a common horizontal plane but on opposite sides of the center line, the microphones being sensitive to compressional waves or acoustical vibrations within a predetermined frequency range transmitted through the water from a submerged submarine. While the microphones 10 and 10a may be of any desired construction to operate within the selected frequency range, we prefer to employ microphones of the form disclosed in a copending application of C. K. Stedman et al., Serial No. 502,077 filed September 11, 1943 now Patent No. 2,886,794. The microphones per se form no part of the present invention and are shown schematically as comprising a generally cone-shaped supporting element 11 adapted to be mounted in the head of the torpedo with the base of the cone welded or otherwise secured to the inner wall of the head. On the reduced end of each supporting element 11 is a magnetostrictive tube 11a disposed within the turns of a coil 12 and containing a bar magnet (not shown), one end of the coil being grounded to the torpedo hull. The ungrounded end of the coil 12 of microphone 10 is connected by a wire 13 to the control grid of a vacuum tube amplifier 14, and the ungrounded end of the coil of microphone 10a is connected through a wire 13a to the control grid of a similar vacuum tube amplifier 14a. The connections 13 and 13a are preferably protected against electrical disturbances by means of grounded shields 15. It will be understood that compressional wave signals within the selected frequency range acting upon either of the microphones 10 and 10a result in electromotive forces in the corresponding coil 12 commensurate in magnitude with the intensity of the signals on the microphone. The amplifier tubes 14 and 14a are normally biased by a biasing circuit including an adjustable resistor 16, so that any variations in the relative sensitivities of the two microphones due to structural differences may be compensated by adjusting the resistor.

The plate of amplifier tube 14 is coupled to a brush 17, and the plate of the tube 14a is coupled to a similar brush 17a. A commutator 18 engages the brushes and is driven by a motor M at a predetermined speed, for example, 10 or 12 revolutions per second. The commutator is connected to the control grid forming the input end of a second amplifier tube 19, the output of which may be further amplified by third and fourth stages of amplification 20 and 21. At its output end, the last stage of amplification is connected to an automatic gain control 22, which may be of conventional form, and the output end of the voltage control is connected through wires 23 and 23a to the control grids forming the input ends of the second and third stages of amplification 19 and 20.

It will be apparent that by reason of the commutator 18, the second stage 19 and the following stages of amplification are common to the two microphones 10 and 10a and act to amplify first the output of microphone 10, which may be designated the left microphone, and then the output of the microphone 10a, which may be designated the right microphone. This feature overcomes the disadvanatge inherent in parallel stages of amplification having automatic gain control, namely, that it is practically impossible to obtain equal degrees of amplification from the two stages. The first stage amplifiers 14 and 14a are not affected by the automatic gain control, so that these amplifiers can easily be made to have equal gains and the above-mentioned disadvantage is not present. The disadvantage is not present in the second and following stages of amplification 19, 20 and 21 because the single amplifier of each of these stages treats alike the two alternate inputs from the microphone.

The purpose of the automatic gain control 22 is to limit the output voltages from the amplifiers so that the magnitude of these voltages is independent of the intensity of the input signals from the microphones 10 and 10a. Thus, by employing the AVC 22 and the commutator 18, as described, we provide at the output end of the last stage of amplification 21 signals of limited intensity obtained alternately from the microphones 10, 10a and which vary in intensity according to the percentage difference, rather than the actual difference, between the intensities of the signals received by the microphones. One requirement of the automatic gain control 22 is that it should have a sufficiently long time constant so that it does not change during a switching cycle incident to operation of the commutator 18. If the AVC 22 were able to follow the voltage changes in each switching cycle of the commutator, the output of the two half cycles would be automatically equalized and no steering signals ever received. With a time constant of one second, the change in voltage would be small in a half cycle of the switching means 18, and under these conditions the AVC 22 would measure the peak voltage output of the stronger of the two channels from the microphones 10 and 10a. Thus, if $V_1$ is the voltage developed by one microphone and $V_2$ is the voltage developed by the other, and $V_1$ is greater than $V_2$, then the D.C. output of the amplifier is proportional to $$\frac{V_1-V_2}{V_1} \cdot E_0$$

where $E_0$ is the normal output voltage of the amplifier when acting as a single channel for an input voltage $V_1$. In the region of flat automatic gain control, $E_0$ is independent of $V_1$. If the AVC time constant is not long enough, the actual differential voltage developed by the amplifier may be considerably less than the quantity $$\frac{V_1-V_2}{V_1} \cdot E_0$$

An alternative characteristic which is desirable and can be obtained more closely by the use of linear AVC rectification is a linear relation between the direct current output of the amplifier and the ratio of $V_1$ and $V_2$ in decibels.

The output of the last stage of amplification 21 is impressed upon a rectifier 25, and one side of the output end of the rectifier is connected to a commutator 26 having brushes 27 and 28 which are connected, respectively, to condensers 29 and 30. The commutator 26 is driven by a motor $M_1$ in synchronism with the commutator 18. The condensers 29 and 30 are connected in opposing relation by a common wire which, in turn, is connected through a wire 31 to the other side of the output end of rectifier 25. Resistors 32 and 32a are shunted across the condensers 29 and 30, respectively. Thus, because of the commutators 18 and 26, the condenser 29 is charged for a short time interval from the amplified output of microphone 10, and then the other condenser 30 is charged for an equal time interval from the amplified output of the other microphone 10a. If the signal received from the microphone 10 is more intense than that received from the microphone 10a, the condenser 29 has a greater charge stored in it than the condenser 30 (and vice versa), so that the output of the opposed condensers is in effect a measure of the percentage difference between the intensities of the signals on the two microphones.

The output of the opposed condensers 29 and 30 is conducted through resistors 34 to the control grid at the input end of a D.C. amplifier 35, the output end of the amplifier being connected to a one-sided relay 36 controlling a two-position switch 37. It will be understood that the switch 37 is held by the relay 36 in either one of the two switch positions, depending upon the resultant bias imposed upon the input grid of amplifier 35, which, in turn, depends upon the relative magnitudes of the charges stored in the opposed condensers 29 and 30 and upon the position of a follow-up potentiometer 40 to be described presently. The switch 37 controls an azimuth steering motor 38 of the reversible electric type, and when the switch is in one position, the motor causes an azimuth steering rudder (not shown) to move to the left. Conversely, when the switch 37 is in the other position it causes the rudder to move to the right. The amount of swing of the rudder from its straightforward position is limited by switches 39 and 39a operable by movement of the rudder to extreme positions and included in the field winding circuits of the motor. A follow-up system 40 is operable by the rudder through a suitable mechanical connection (not shown) and includes a potentiometer 40a adjustable by movements of the rudder and connected in the differential circuit of the condensers 29 and 30.

The effect of the follow-up 40 is to cause the motor 38 and its rudder to reverse the direction of their movement periodically as long as the two microphones 10 and 10a are subjected to signals of equal intensity, that is, as long as the torpedo is pointed directly toward the signal source or target. More particularly, assuming that signals of equal intensity are received by the two microphones and that the switch 37 is in the right rudder position, the resulting turning movement of the rudder moves the follow-up potentiometer 40a in one direction to bias the differential circuit of condensers 29 and 30 so that their output acts through the amplifier 35 and relay 36 to move the switch 37 to the left rudder position. The resulting reverse movement of the rudder adjusts the potentiometer 40a in the opposite direction so as to change the bias on the input grid of amplifier 35. Accordingly, the relay 36 is operated and moves switch 37 back to its initial position to cause the rudder to swing back to the right rudder position, and the operation is repeated so that the rudder moves continually back and forth a slight amount, this movement of the rudder, however, being insufficient to produce any appreciable steering action or wobbling of the torpedo. The advantage of this feature is that when one of the microphones receives a more intense signal than the other, the necessary movement of the rudder can be effected without overcoming the friction which would otherwise be present due to sticking of the rudder when it is held stationary.

If at any time the torpedo should not be pointed directly at the source of compressional waves or signals, a signal voltage is applied to one of the condensers 29, 30 due to a more intense signal on one of the microphones than on the other, thereby causing relay 36 to hold switch 37 in one of its two positions, depending upon which microphone receives the more intense signal. As a result, the rudder moves in a corresponding direction through a relatively large sweep to steer the torpedo back toward the signal source and thereby equalize the signal intensities on the microphones. The rudder continues to move without interruption in the direction indicated by the relative signal intensities on the microphones, so long as the biasing action from the microphones on the circuit of the opposed condensers 29, 30 prevails over the opposing biasing action of the rudder potentiometer 40a, which increases as the rudder moves farther from its straightforward position. Thus, the distance through which the rudder moves in the indicated steering direction without interruption is determined by the difference in the signal voltages applied to the condensers 29 and 30 from the corresponding microphones, and the rudder movement in the indicated steering direction ceases as soon as the biasing action of the rudder potentiometer 40a increases to the point where it overcomes the biasing action of the microphones on the circuit of condensers 29 and 30. Thereupon, the relay 36 moves switch 37 to its opposite position and causes the rudder to swing back toward its straightforward position until the biasing action (now decreasing) of the rudder potentiometer 40a is overcome by the biasing action of the microphones on the circuit of condensers 29 and 30, whereby the rudder movement is again reversed. Thus, the rudder is caused to oscillate or hunt about the steering position to which it is actuated as a result of the unequal intensities of the signals on the two microphones.

It will be apparent that the rudder movement resulting from a more intense signal on one of the microphones than on the other eventually acts to turn the torpedo in the direction of the signal source so that the intensities of the signals on the microphones tend to equalize, whereby the net biasing action of the microphones on the steering circuit of condensers 29 and 30 decreases. As this biasing action of the microphones decreases, the motor 38 moves the rudder back toward its straightforward position, due to the biasing action of potentiometer 40a. If at any time during the return movement of the rudder the biasing action from the microphones should again prevail over the biasing action of potentiometer 40a, due to the latter decreasing more rapidly than the biasing action from the microphones, the relay 36 will move switch 37 back to its first position and again reverse the rudder movement until the biasing action of the potentiometer once more prevails over that of the microphones. Accordingly, the rudder may flutter as it returns from the position to which it was moved by the unequal signal voltages from microphones 10 and 10a. When the rudder action points the torpedo directly at the signal source, thereby equalizing the signal intensities on the microphones, the rudder resumes its oscillating movement about its straightforward position, as previously described.

The purpose of the combination of the two microphones 10 and 10a, the automatic gain control 22 and the follow-up potentiometer 40 is to insure that the corrective force applied by the rudder in any situation is proportional to the target angle with the torpedo axis, the ratio of the corrective force to this angle being independent of the strength of the signal from the source and the distance to the source. The steering movements of the rudder from its straightforward position are opposed by the biasing action of potentiometer 40 on the steering circuit of condensers 29 and 30 to prevent overcontrol of the direction of the torpedo. It will be apparent from the foregoing that hunting of the torpedo about a straight path to the signal source is prevented when one of the microphones receives a more intense signal than the other.

A third microphone 42 is mounted on the torpedo hull below the horizontal plane of microphones 10, 10a and is used in controlling the depth steering of the torpedo by means of a suitable depth rudder (not shown). The microphone 42 is constructed to respond to compressional waves or sound vibrations within the same frequency range in which the azimuth microphones 10 and 10a operate and may be of any desired form. Preferably, the microphone 42 is of the form disclosed in said copending application and patent of C. K. Stedman et al. and includes a metal ring 42a welded or otherwise secured to the inner wall of the hull H to define an operating diaphragm. Mounted on the central portion of the diaphragm is a magnetostrictive tube 42b disposed within the turns of a coil 42c, one end of the coil being grounded to the hull. The microphone 42 may be mounted on the bottom of the torpedo hull amidships, or it may be mounted in the head of the hull below the azimuth microphones 10 and 10a, so that the field of microphone 42 is in front of the head and the microphone is less affected by vibrations induced by the torpedo itself and by their reflection from the ocean bottom. The advantage of mounting the microphone 42 amidships and on the bottom of the hull is that the microphone in this position is not affected by reflection of the compressional waves down from the surface of the water.

The ungrounded end of the coil 42c is connected by a wire 42d to the control grid of a vacuum tube amplifier 43, the connection 42d being preferably shielded electrically by a sheathing 15a. The output of amplifier 43 may be amplified by additional stages of amplification 45, 46, and 47. At its output end, the automatic gain control 22 is connected through wires 48 and 48a to the control grids forming the input ends of amplifiers 45 and 46, the connection to amplifier 45 being made through a variable resistor 49. Since there is only one depth steering microphone, it is not possible to regulate automatically the gain of the depth steering amplifier by its own signal, because all directionality of the depth microphone would then be eliminated. The purpose of AVC on the depth steering amplifier is the same as on the azimuth amplifier, namely, to make the direct current amplifier output dependent upon the target angle with the torpedo axis and independent of the target signal intensity. One way of accomplishing this with the depth steering amplifier is to use automatic gain control fed over from the azimuth amplifier, as shown.

It should be noted that the microphone 42 has a definite directional pattern so that its response is much greater for a given signal strength when the signal comes from nearly directly underneath than when the signal travels in a direction nearly parallel with the axis of the torpedo.

The output of the last stage of amplification 47 is rectified by a D.C. rectifier 50, the output end of which is connected to a variable resistor 51 in a control circuit 52. The control circuit 52 comprises a D.C. current source 53 and potentiometers 54 and 55 connected in parallel with the current source. A pendulum (not shown) operates the potentiometer 54 in accordance with changes in the inclination or declination of the torpedo from an even keel, a pendulum-operated potentiometer suitable for this use being disclosed in a copending application of L. K. Davis, Serial No. 502,071 filed September 11, 1943, now Patent No. 2,903,665. The potentiometer 55 is operated by a hydrostatic bellows (not shown) in accordance with changes in the depth of the torpedo in the water. A third potentiometer 56 is connected in series with the current source 53 and the resistor 51 and is operated by the depth rudder in the same manner as the potentiometer 40a is operated by the azimuth rudder. The potentiometers 54 and 55 are connected in parallel to a wire 52a and resistors 57 which, in turn, are connected to the control grid of a D.C. amplifier 58 similar to the amplifier 35. A relay 59 is controlled by the output of amplifier 58 and operates a two-position switch 60 for controlling a reversible electric motor 61 connected mechanically to the depth rudder. The movements of the depth rudder are limited by switches 62 and 62a included in the circuits of the field windings of the motor.

Assuming that there is no appreciable signal received by microphone 42 and that switch 60 is in the up-rudder position, the motor 61 moves the rudder and the potentiometer 56 in a direction to bias the control circuit 52 so that its output, as amplified by tube 58, reverses the relay 59. Thereupon, the switch 60 is moved to the down-rudder position and causes movement of the rudder and the potentiometer 56 in the opposite direction so as to reverse the bias on control circuit 52, with the result that the amplified output of the control circuit returns relay 59 to its original condition and again reverses the movement of the rudder. This cycle is repeated so that the depth rudder swings up and down continually with an oscillating motion in the same manner as the azimuth rudder. In the event that the torpedo should move to a depth which is inconsistent with the setting of the hydrostatic bellows connected to potentiometer 55, the latter is operated by the bellows to bias the control circuit 52 and thereby operate the depth rudder so as to counteract the change in depth. That is, if the torpedo should run too deep, for example, the potentiometer 55 is operated by the hydrostatic bellows to bias the control circuit so that its amplified output holds relay 59 for a longer period in the up-rudder position. The resulting tilting of the torpedo hull, to cause it to ascend, operates the pendulum potentiometer 54 to produce a counteracting bias on the control circuit, whereby the hull is prevented from ascending too steeply. In other words, the effect of the pendulum potentiometer 54 in combination with the hydrostatic potentiometer 55 is to level out the ascent or descent of the hull and prevent hunting of the torpedo about its intended depth level.

When the microphone 42 receives a signal from a target below the level of the hull, the amplified output from microphone 42 acts on the control circuit 52 to bias the circuit and thereby hold the relay 59 in the downrudder position, until the microphone biasing effect is overcome by counteracting operation of the follow-up or rudder-actuated potentiometer 56, the hydrostatic potentiometer 55 and the pendulum potentiometer 54. Thus, as the torpedo approaches the signal source or submarine, the depth-steering system under control of microphone 42 automatically directs the torpedo down to the depth of the submarine, in the event that the latter is below the level for which the hydrostatically controlled potentiometer 55 is set. It will be apparent that if the submarine is above the level for which the hydrostatically controlled potentiometer 55 is set, the depth-steering system cannot direct the torpedo upwardly to the submarine, because microphone 42 is not affected by compressional wave signals from above the torpedo hull. However, by setting the hydrostatically controlled potentiometer 55 for a minimum submarine depth, the torpedo may be prevented from passing beneath the submarine.

The circuits of the azimuth and depth-steering motors 38 and 61 include switches 64 and 64a, respectively, which are normally open when the torpedo is being carried by the plane and while it is dropped from the plane. When the torpedo strikes the water and moves to a predetermined depth, a hydrostatically operated bellows (not shown) operates relays 65 and 65a to close the motor switches 64 and 64a. Additional safety relays (not shown) may be included in the amplifier and relay circuits for maintaining the circuits normally inoperative, and when the torpedo is released from the plane an arming switch is actuated automatically to energize the safety relays and thereby render the control system operative. The propelling motor (not shown) may be operated directly from a storage battery in the torpedo hull through a normally open switch which is closed by a relay connected to the arming switch when the torpedo is dropped from the plane, so that the propeller is rotated before the torpedo strikes the water.

Preferably, the torpedo is caused to cruise in a circle after it enters the water and when there is no compressional wave signal from a target. To this end, the azimuth rudder is normally maintained slightly off center by initial adjustment of the potentiometer 40a. However, when one of the microphones 10, 10a is subjected to a signal within the predetermined frequency range, as from a submerged submarine, the resulting signal voltage impressed upon the corresponding condenser 29 or 30 is sufficiently large to render the initial biasing of potentiometer 40a negligible, whereby the azimuth rudder is operated through switch 37 and motor 38 to steer the torpedo out of its cruising circle and in the direction of the submarine.

We claim:

1. In an electric control system for steering, electronic means for azimuth steering, an automatic gain control operatively coupled to said electronic means, a second electronic means for vertical steering, and means for coupling the automatic gain control to said last electronic means.

2. In an electric control system for steering, a pair of directional microphones, an amplifier coupled to one of said microphones, an automatic gain control coupled to the amplifier, control means coupled to the output end of the amplifier for azimuth steering, a second amplifier coupled to the other microphone, means for coupling the automatic gain control to said last amplifier, and control means coupled to the output end of said last amplifier for depth steering.

3. In a control system for steering, a pair of directional azimuth microphones, an amplifier, switching means for coupling the amplifier alternately to said microphones, control means for steering in azimuth in accordance with the relative intensities of the amplifier output from the two microphones, a second switching means operable synchronously with said first switching means for delivering the output of the amplifier to said control means, an automatic gain control coupled to the amplifier, a vertical steering microphone, an amplifier coupled to said last microphone, means for coupling the automatic gain control to said last amplifier, and depth-steering control means coupled to the output end of said last amplifier.

4. A sonically controlled steering system for a torpedo comprising a rudder, a pair of hydrophones, means for deflecting said rudder in accordance with the relative intensities of compressional wave signals received by said hydrophones to steer the torpedo toward the source of said signals, means for amplifying the outputs of said hydrophones, means for steering the torpedo along a prescribed path when the intensity of said signals at said hydrophones is below a preassigned level, and means controlled by said amplifying means for disabling said steering means when the intensity of said signals at said hydrophones is at least as great as said preassigned level.

5. A torpedo comprising a body, a rubber, a pair of hydrophones mounted on opposite sides of said body, circuit means for resolving the outputs of said hydrophones into a control signal, means for deflecting said rudder in accordance with said control signal, means for impressing a bias in said circuit means effective to cause deflection of said rudder to steer the torpedo along a circular course, and means for disabling said bias impressing means whenever the outputs of said hydrophones are of at least a prescribed intensity.

6. A signal controlled steering system for a moving body comprising a rudder, a pair of signal translating devices, means for resolving the outputs of said devices into an alternating current signal proportional in amplitude and related in polarity to the difference of said outputs, means for rectifying said alternating current signal on a time basis to produce a direct current signal corresponding in polarity to the polarity of said alternating current signal, and means for deflecting said rudder in one direction or the other in accordance with the polarity of said direct current signal.

References Cited by the Examiner

UNITED STATES PATENTS

| | | | |
|---|---|---|---|
| 2,341,287 | 2/1944 | Pookhir et al. | 114—23 |
| 2,453,828 | 11/1948 | Barry et al. | 114—24 |
| 3,215,109 | 11/1965 | Dunn | 114—23 |
| 3,215,110 | 11/1965 | Robertson | 114—23 |

BENJAMIN A. BORCHELT, *Primary Examiner.*

B. YUNG KWAI, FRED C. MATTERN, JR., *Examiners.*

L. M. MARTIN, P. A. SHANLEY, *Assistant Examiners.*